United States Patent [19]

Rosenberg

[11] Patent Number: 5,124,882
[45] Date of Patent: Jun. 23, 1992

[54] ELECTRIC POWER TRANSMISSION MODULE

[76] Inventor: Paul A. Rosenberg, P.O. Box 507, Ft. White, Fla. 32038

[21] Appl. No.: 503,913

[22] Filed: Apr. 4, 1990

[51] Int. Cl.⁵ .............................................. H05K 7/20
[52] U.S. Cl. .................... 361/384; 174/16.1; 174/68.3; 361/427; 361/428; 361/429
[58] Field of Search ........................ 174/16.1, 68.3, 95, 174/97, 101; 248/68.1; 361/383, 386, 427, 428, 429

[56] References Cited

U.S. PATENT DOCUMENTS 4,391,426  7/1983  Gothberg ........................... 174/97

FOREIGN PATENT DOCUMENTS 0572670  3/1959  Canada ............................. 174/68.5
1440139  12/1966  France .............................. 174/101

Primary Examiner—Gregory D. Thompson

[57] ABSTRACT

An electric power transmission module has a element for supporting at least one electric conductor disposed within a three-sided housing section and rigid base. The housing section being detachably secured to the base and the housing section being a unitary member. The module may further have a disconnect switch unit integrated therewith. An electric power transmission system may be formed of a series of such modules being interconnected end to end.

12 Claims, 1 Drawing Sheet

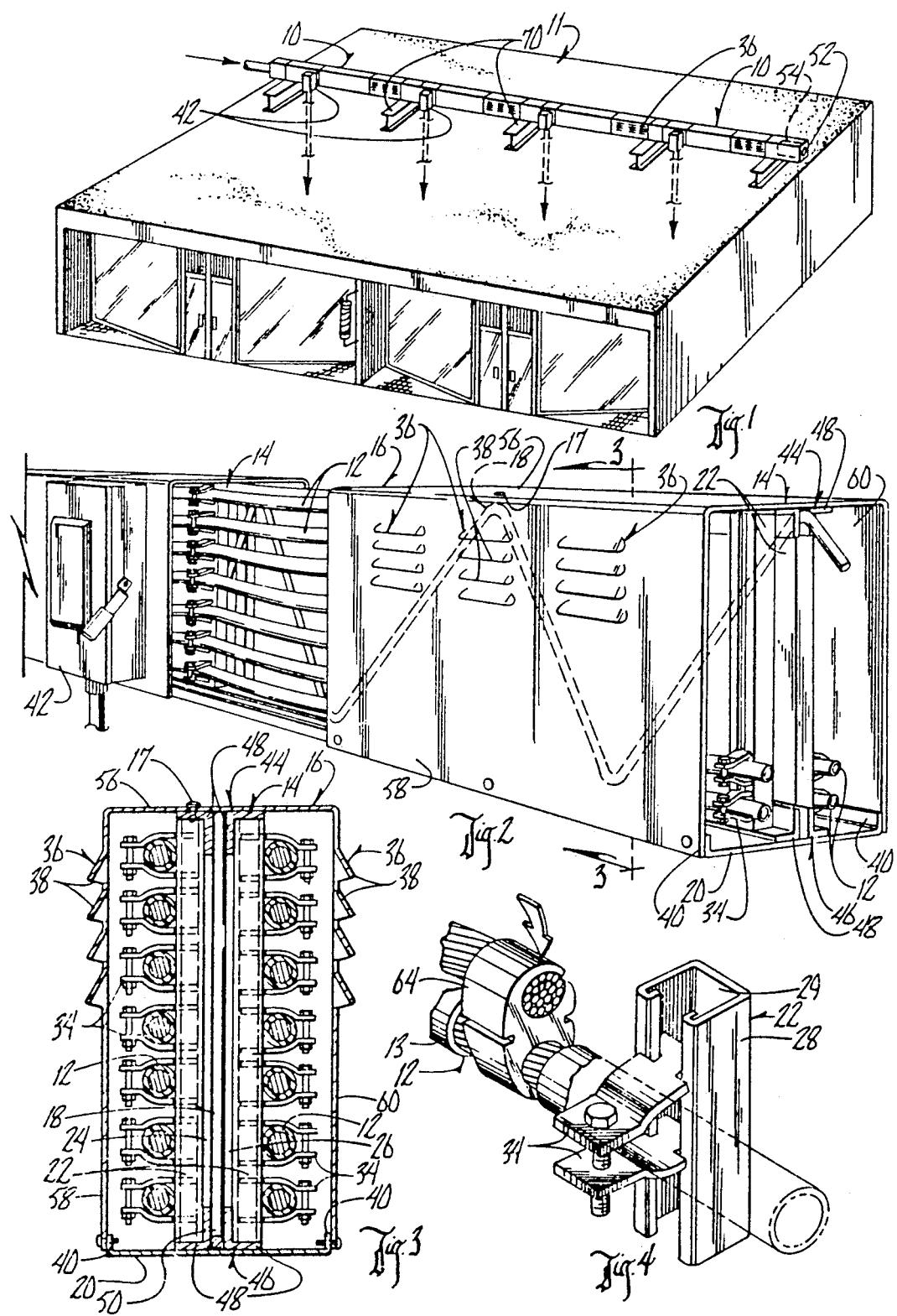

ELECTRIC POWER TRANSMISSION MODULE

TECHNICAL FIELD OF THE INVENTION

The present invention is in the technical field of electric power transmission and distribution.

BACKGROUND OF THE INVENTION

In a typical municipality, electric power is furnished to electric power consumers via main power lines, which are the principal or major circuits of the electric power system. Such main power lines are generally routed so as to be reasonably close to the various residential and business facilities that are to be supplied with electric power. In between the main power lines and the facilities to be supplied with electric power are intermediate circuits that tap into the main power lines. (In the electrical trade, these circuits are commonly called "service drops" when run overhead, and "service laterals" when run underground.) If a main line is supported overhead by a pole, the intermediate circuit therefrom is supported at one end from either the pole or from properly secured power conductors, and supported at the other end by direct attachment to the facility being served, usually high up on a wall. If the main line is underground, the intermediate circuit is generally run to the facility either in a buried electrical conduit or as directly buried cable.

The intermediate circuit is run through a main disconnect switch, electric meter, and into an electric distribution panel that divides the intermediate circuit into a number of tertiary circuits.

A tertiary circuit is generally encased in an electrical conduit that houses the elongated electrical conductor, and each circuit for a given facility is generally encased in its own conduit. Such conduits through which wires (conductors) are installed are relatively expensive to install. Electric circuits contained in such conduits may also be difficult and expensive to repair because such conduits do not allow easy access to the conductors within, particularly when the conduit is rather long and there is no means of determining where along its length the site of the problem lies.

The present invention provides an electric power transmission and distribution device that is generally useable in place of tube or pipe conduits and wiring, and is particularly advantageous for tertiary circuits (commonly called "feeders") supplying power to multi-unit facilities, which use many such tertiary circuits. For multi-unit facilities, for instance office buildings, shopping centers, and the like, a plurality of tertiary circuits may be combined in one unit of the present invention. In such instances, a tap may be made into the present invention near a unit requiring power, rather than extending a separate tertiary circuit from the unit to an electric room, which would be considerably further than the location of the tap. The invention provides an electric power and transmission device that is considerably less expensive to install and repair than conventional circuits contained in tube or pipe conduits. The present invention provides such a device that carries a plurality of circuits. The present invention provides such a device to which one or more fused disconnect switches may be integrated at any locations desired along its length. Certain advantages of the present invention are derived regardless of whether the the device is used in substitution for a single conduit and circuit or a plurality thereof.

BRIEF DESCRIPTION OF THE DRAWINGS

FIG. 1 is a perspective view of a series of electric power distribution and transmission modules of the present invention mounted on the roof of a multi-unit facility;

FIG. 2 is a perspective view of an electric power transmission and distribution module of the present invention with certain components removed;

FIG. 3 is a side view of the electric power transmission and distribution module of FIG. 2, taken along line 3—3 of FIG. 2;

FIG. 4 is a perspective view of a section of a conductor and support means of the electric power transmission and distribution module of FIG. 2 showing a tap thereto.

PREFERRED EMBODIMENTS OF THE INVENTION

Referring now to the drawings, there is shown generally in FIG. 1 a series of electric power transmission and distribution modules of the present invention designated generally by the reference numeral 10. The modules 10 are interconnected end to end forming an elongated series of modules 10 that extends from one side to the other side of of a multi-unit facility 11, on the roof thereof, and hence a portion of the series is disposed above each of the units (shown as stores) of facility 11. Integrated with the modules 10 are a plurality of fused disconnect switch units 42, and as shown, there is one such disconnect switch unit 42 integrated with a module 10 at a location directly above each unit of the multi-unit facility 11, through which electric power is supplied to that unit, as discussed in more detail below.

Referring now to FIG. 2, FIG. 3, and FIG. 4 also, the module 10 as shown holds a plurality of electric conductors 12. The module 10 includes at least one means for supporting an electric conductor 12, designated generally by the reference number 14. The support means 14 is preferably comprised of an internal frame 18 and at least one series of means for mounting said conductor 12, designated generally by the reference number 22, the mounting means 22 of the series being secured to one of the two sides (first side 24 or second side 26) of the internal frame 18. A series of mounting means 22 support an electric conductor 12 by holding the electric conductor 12 at intermitent locations along the length. The support means 14 is mounted on a substantially rigid base, and in the prefered embodiment shown, the internal frame 18 of the support means 14 is mounted on the base 20. In prefered embodiment, and as shown, a plurality of conductors 12 are supported by the support means 14.

The internal frame 18, as shown in the drawings and in prefered embodiment, is positioned centered on the base 20 and a plurality of series of mounting means 22 are secured on each of the first and second sides 24, 26 of the internal mounting 18. On each of the sides of 24, 26 of the internal frame 18 a plurality of electric conductors 12 are held spaced-apart from each other in alignment parallel to the extent of the internal frame 18 (in vertical alignment as shown). The electric conductors 12 are also held spaced-apart from the internal frame 18, as discussed below. The internal frame 18, mounting means 22, and electric conductors 12 are substantially enclosed by a combination of the rigid base 20 and a unitary housing section 16, or a plurality of unitary housing sections 16, as discussed further below.

As shown, and in prefered embodiment, a single mounting means 22 is composed of a channeled strip 28 and an insulating clamp 34 mounted on the channelled strip 28. Each of the channelled strips 28 are mounted on one side or the other of the internal frame 18 and on to each channelled strip 28 are mounted a plurality of clamps 34 one above the other. Each clamp 34 is shown encircling and thus holding a portion of an electric conductor 12. A series of mounting means 22 would be comprised of two elongated strips 28, each secured to the internal frame 18, spaced-apart from each other, and each having mounted thereon at least one clamp 34 so arranged that one such two-piece clamp 34 holds an electric conductor 12 spaced-apart from internal frame 18 in a position suspended above the rigid base 20.

In prefered embodiment, as shown in the drawings, there are a plurality of series of mounting means 22, and a plurality of electric conductors 12, each held by a series of mounting means 22 in a position spaced-apart from each other and spaced-apart from the internal mounting frame 18. In further prefered embodiment, also as shown in the drawings, the plurality of series of mounting means 22 that are secured to one of the first or second sides 24, 26 of the internal frame 18 share elongated stips 28. That is, the elongated strips 28 have a plurality of insulating clamps 34, mounted one above the other along the length of the elongated strips 28, and the insulating clamps 34 each form a series of mounting means 22 together with at least one insulating clamp 34 on an adjacent elongated strip 28.

In the embodiment shown in FIGS. 2 to 4, the module 10 includes 14 electric conductors 12, seven of which are held on the first side 24 of the internal frame 18 and seven of which are held on the second side 26 of the internal frame 18. Each of the elongated strips 28 are disposed spaced-apart and substantially parallel with respect to each other.

Generally within a module 10 there are a plurality of elongated strips 28 secured to each of the sides 24, 26 of the internal frame 18. Along the length of each such elongated channelled strip are mounted a plurality of clamps 34, one clamp for each conductor 12 to be supported on that side of the internal frame 18. Each such electric conductor 12 is held by each clamp 34 in a series, that is, a clamp 34 on each channelled strip 28 disposed substantially the same distance above the base 20 and the other clamps 34 in the series. By such means the electric conductors 12 of each side of the module 10 form an arrangement wherein they extend in substantially parallel lines from one another and lie in substantially the same vertical plane. Thus the electric conductors 12 of a module 10 are secured spaced apart from one another, and from the internal frame 18 within a module 10 of relatively compact size, and yet each conductor 12 is accessible from its respective side of the module 10, no conductor 12 being disposed behind another.

The housing 16 of the module 10 substantially forms three of the four sides of the module 10 as shown in the drawings, and the housing 16 together with the base 20 comprise a protective covering for the internal frame 18, support means 14 and the electric conductors 12. The housing 16 in preferred embodiment is detachably secured to the base 20 so that it may be removed when access to any of the internal components of the module 10 is desired. In further preferred embodiments, the housing 16 has at least one, and preferrably a plurality of vents 36, each having a downward sloping rim 38 to protect its opening from the outer enviroment. As shown, the base 20 is formed with a flange 40 on each side which cooperates with the lower edges of the housing 16 for the attachment and detatchment of the housing 16 to the base 20, as will be discussed in more detail below.

The module 10 of the present invention has at least one, and preferably a plurality of, electric conductors 12 held in such a position that it is in contact with the air along substantially its entire length. The electric conductor is encased or sheaved, and hence not open to the atmosphere, only along the intermittant points where it is held by the insulating clamps 34. When an electric conductor is so disposed with free air circulating around it, as compared to an electric conductor substantially enclosed from the atmosphere, for instance by being disposed in a conventional conduit such as a pipe, heat is dissapated more readily, reducing the operating temperature of the conductor and hence increasing its efficiency.

The housing 16 is formed in at least one unitary section comprised of a top 56 and first and second spaced-apart sides 58, 60. In preferred embodiment a housing section 16 is formed to have a U-shaped cross-section profile. Each of its sides 58, 60 is attachable to the base 20. In more detail, the ends of the sides 58, 60 of the housing 16 fit outside the flanges 40 on the sides of the base 20, or in other words the housing 16 recieves the flanges 40 of the base 20, and can be secured thereto in a conventional manner such as with bolts or screws. The housing is formed of 12 to 14 gauge painted sheet metal, or other material of commensurate strength and rigidity, and its strength and rigidity are enhanced by its attachments at the end of each side to the rigid base 20. The housing 16 protects the internal components of the module 10 from the enviroment and such function is served advantageously further by the feature of the housing 16 being fitted to the base flanges 40 so that such flanges 40 are disposed themselves within the housing 16.

A single unitary housing section 16 may extend the full length of a module 10, or may be formed in smaller sections so that the module 10 is provided with a plurality of housing sections 16, and for other purposes as discussed further below. For servicing any component within the module 10, the housing section 16, or a plurality of housing sections 16, is simply removed, exposing the conductors 12 supported therein, which conductors 12, as noted above, advantageously disposed one above each other on each side of the module's internal frame 18. Hence each conductor 12 may be reached without having to reach around, or in any way disturb, another conductor 12.

To tap into one of the conductors 12 within the module 10, in preferred embodiment a conventional fused disconnect switch unit 42 may be integrated into the module 10 by mounting such disconnect switch unit 42 on one of the sides 58, 60 of the housing section 16 and providing access for the tap conductors through the housing section 16 behind the mounted disconnect switch unit 42 by apeture(s) through the housing section 16. In preferred embodiment the section of housing 16 onto which the disconnect switch unit 42 is mounted is formed to extend only the width of the disconnect switch unit 42 or slightly more than the width of the disconnect switch unit 42, whereby the housing section 16 that normally would be disposed adjacent to the housing section 16 on which the disconnect switch unit 42 is mounted may be removed to provide easy access to the internal components of the module 10 in the area adjacent the disconnect switch unit 42 while the disconnect switch unit 42 and the housing section 16 on which it is mounted are in place, and secured to the base 20. In practice, a housing section 16 of about 2 feet in length has been found extremely convenient for use as the housing section 16 upon which conventional disconnect switch units 42 may be mounted.

The tapping into a conductor 12 of a module 10 may be done using any approved electrical splicing means, for instance the type AH compression tap connector shown in FIG. 4 wherein the insulation 13 of the conductor 12 being tapped is shown removed in the area of the connector 64. In practice the conductor 12 and the connector 64 would be insulated after the tap is made by conventional means, such as by wrapping with electrical tape or the like. Other approved means of tapping, such as by using insulation piercing connectors, parallel or "tee" tap connectors with insulating covers, and the like of course could also be used. The tap conductors of course are run through the disconnect switch unit 42, and hence the tapping is usually done at a portion of the electric conductor 12 in close proximity to the location of the mounted disconnect switch unit 42, normally within 5 feet, access to the region being allowed by removing the housing section 16 adjacent to the housing section on which the disconnect switch unit 42 is mounted.

In preferred embodiments, the module 10 of the present invention contains a plurality of electric conductors 12. and in more preferred embodiment such conductors 12 are high current conductors, such as for instance 615 or 700 amps, as compared to a standard conduit containing three or four 100 to 200 amp conductors. While a module 10 is typically about 12 inches wide and 16 inches high, it may be up to 20 inches wide and 32 inches high, and if larger than that, the advantages in handling, installation and the like are diminished. If a module 10 of greater length than manufactured length is desired, modules 10 may be interconnected one to another at their ends forming a single effective module 10, with the joints of the individual module frames being welded together during installation.

Disposing the electric conductors 12 held on each side of the internal frame 18 in positions one above the other not only makes each separate conductor 12 readily accessible from its respective side of the module 10, it generally permits a module 10 to be equipped with about four, or five, or more conductors 12 on each side of the internal frame 18 to be formed, without any excess internal space, as a unit that is somewhat higher than it is wide, and preferably from about 20 to 80 percent higher than it is wide. Such modules 10 are easier to handle and install than units that are closer to square in cross-section or units that are wider than they are high.

It is generally preferable to dispose the insulating clamps 34, and hence the channelled strips 28 that support the clamps, as far apart from each other as is reasonable without jeapordizing the ability of the series of clamps 34 to hold a conductor 12 in a substantially straight-line position. If the clamps 34, and their supporting channelled strips 28, are more closely spaced than necessary, a greater portion of the conductor 12 than necessary would be enclosed by the clamps 34 and the unnecessary clamps 34 would occupy additional space within the module 10, interfearing with air circulation and heat dissipation. Further, the additional clamps 34 and supporting strips 28 would unnecessarily increase the weight and the cost of the module 10. In practice it has been found that spacing the channelled strips, and hence the clamps 34 of the horizontal series, a distance of from about 30 to 36 inches apart, depending on the size of the conductor(s) held thereby, is highly advantageous.

As best shown in FIG. 4 of the drawings, in preferred embodiment the elongated strip 28 of the support means 14 is formed with a channel 29 that is opened toward the side of the housing 16 and the clamps 34 are mounted within the channel 29. The form of the elongated strip 28 with a channel 29 is commercially available channel framing under the trademark EnduroStrut from Enduro. Such channel framing is available as a polyester or vinyl ester resin based composition. The clamps 34 as shown are likewise commercially available under the trade designation of "Non-metallic" Universal Pipe Clamps from Enduro, and are made from a toughened grade of glass reinforced thermoplastic polyester resin. Such two-piece clamps 34 are held within the channel 29 at one end, and are fastened at the other with standard hex bolts and nuts.

While the housing 16 and the internal frame 18 may be formed of various metals, the clamps 34 and the elongated strip 28 supporting the clamps 34 should be formed of material that does not conduct electricity, for instance various and other plastic resin based compositions.

In order to protect the internal components of the module 10 from the enviroment, the end of the module 10, or series of interconnected modules 10, is enclosed at the end with an end cap 52 which may be formed of the same material as the housing 16 and is secured thereto by conventional means such as screws or bolts. When a plurality of modules 10 are connected in series, or when a plurality of sections of housings are employed in a given module 10, one housing section overlaps the adjacent housing section and the overlapping housing sections are secured together by bolts or screws or the like.

The internal frame 18 should be rigid and may be formed of a variety of materials, including without limitation steel, aluminum, and the like, although steel is preferred because it provides the strength and rigidity required at a reasonable cost. The internal frame 18 as shown is a section of open web steel joist which is a commercially available product. The frame 18 as shown is comprised of an upper and lower member 44, 46 each of which is formed of two L-shaped members 48, spaced-apart from each other and opening outward in opposite directions. The adjacent L-shaped members and the upper and lower members 44, 46 are interconnected by a plurality of diagonally-spaced rods 50 which span the distance between the upper and lower members 44, 46. The frame 18 extends the length of the module 10 and the elongated strips 28 supporting the clamps 34 are attached on either side of the frame 18 by conventional means such as bolts or screws or the like.

The module 10 may be manufactured as a one-piece unit, with a detachable housing 16, which housing 16 may be formed in sections, ready for transporting to, and installation at, the site of use. The electric conductors 12 may be incorporated into the module 10 at the site of use or may be incorporated during the manufacture of the module 10.

The module 10 may include a means for providing air flow through the module 10 other than the side vents 36 in housing 16. Such means for providing air flow preferably is a forced-air blower 54 as shown in FIG. 1. Such forced-air blower 54 is mounted in the module 10 at the far end in a space within the housing 16 beyond the ends of the conductors 12.

The module 10 as shown in the drawings is suitable for installation with its base 20 on, or disposed parallel to, a substantially horizontally surface, or a surface inclined to about an angle of about 45 degrees or less from horizontal. A module may also be installed so that its base is disposed on an incline greater than about 45 degrees from the horizontal up to a vertical position, provided the means for weatherproofing, for instance the vents, if any, are modified from that shown in the drawings. The module, for instance, may be conveniently installed on a roof of a building. As an example, if used for a shopping mall that has a row of shops, or units, within an elongated facility, and hence a portion thereof will be disposed on the roof above each unit or shop. The individual circuits for each unit may thus be conviniently tapped into the circuits of the module at a point immediately above the unit. Similarly for a multi-story commercial, industrial or residential building, it may be convenient to install a module or series of modules vertically, up the side of the building, so as again to dispose the circuit tap for each unit in very close proximity to the unit. It is believed that the present invention so reduces the the overall length of electric conductors required to distribute electric power to a given facility, particularly a given multi-unit facility, that the electric power dissipated through the resistance of such conductors is lessened, and the cost of the electric power is thus reduced.

As shown in FIG. 1, when a module 10 or series of modules 10 are installed on a roof, it is convenient to support the series at intervals above the surface of the roof with support beams 70 or the like so as to protect the modules 10 from puddles of water or the like that may collect on the roof's surface, and further to position the modules at a convenient height for installation of taps, repairs or the like.

It is preferable to have the housing section(s) 16 secured to the top of the internal frame 18 using bolts 17 as shown in FIG. 2 and FIG. 3. Referring to FIG. 2, there is shown one open end of the module 10 having exposed through such end less conductors 12 than otherwise shown in the drawing. This depiction of the module 10, as to the open end, is for the purpose of illustrating the internal components better, and in practice generally the same number of conductors 12 would extend through to the end of the module 10 and the end would be enclosed, as discussed above, with an end cap 52.

INDUSTRIAL APPLICABILITY OF THE INVENTION

The present invention is applicable to the electric power transmission and distribution industries, and any industries employing electric power.

I claim:

1. An electric power transmission module comprising;
   a means of supporting at least one electric conductor;
   a substantially rigid base;
   said supporting means mounted on said base; and
   at least one unitary housing section, said housing section being composed of a top and spaced-apart sides, each of said sides being attachable to said base, wherein said supporting means is normally disposed within said housing section;
   said supporting means being comprised of an internal frame, and at least one means for mounting at least one conductor, said mounting means being secured to said internal frame;
   said internal frame is secured to said rigid base and to said top of said unitary housing section;
   said internal frame extends substantially the length of said unitary housing section and has two sides facing said sides of said unitary housing section, and wherein at least one series of said mounting means is secured to each of said two sides of said internal frame.

2. The module of claim 1 wherein said mounting means is comprised of a plurality of elongated strips disposed vertically from said base and a plurality of clamps mounted on each elongated strip.

3. An electric power transmission module comprising:
   an elongated substantially rigid base;
   an elongated substantially rigid internal frame, said internal frame being mounted on said base and substantially extending therewith;
   at least one housing section having a top and two sides;
   said internal frame being comprised of a top and bottom said top and bottom being interconnected with means holding said top and bottom in spaced-apart relationship;
   said bottom of said frame being connected to said base;
   said top of said frame being connected to said top of said housing section;
   said sides of said housing section being detachably secured to said base;
   a plurality of insulating clamps;
   means for mounting said clamps;
   said mounting means being secured to said internal frame and said clamps being mounted by said mounting means;
   and an end cap enclosing one end of said housing section.

4. The module of claim 3 further including a plurality of said mounting means, at least one of which is secured to each side of said internal frame.

5. The module of claim 4 wherein said module is about 20 to about 80 percent higher than it is wide.

6. The module of claim 4 further including a forced-air blower mounted in said unitary housing section.

7. The module of claim 4 further including a disconnect switch integrated with said module by being mounted thereto on the outer side of said housing section.

8. The module of claim 7 wherein said module has a plurality of unitary housing sections, and said disconnect switch is mounted on one side of said housing section in a position in close proximity to the adjacent housing section.

9. The module of claim 7 wherein said base has flanges along its sides and said flanges are disposed within the sides of said housing section.

10. The module of claim 3 further including:
    a plurality of electric power transmission modules interconnected end-to-end.

11. The module of claim 10 wherein at least one of said modules has a housing section that is vented.

12. The module of claim 10 further including a plurality of electric conductors extending through at least a plurality of adjacent unitary housing sctions and being supported therein.

* * * * *